UNITED STATES PATENT OFFICE.

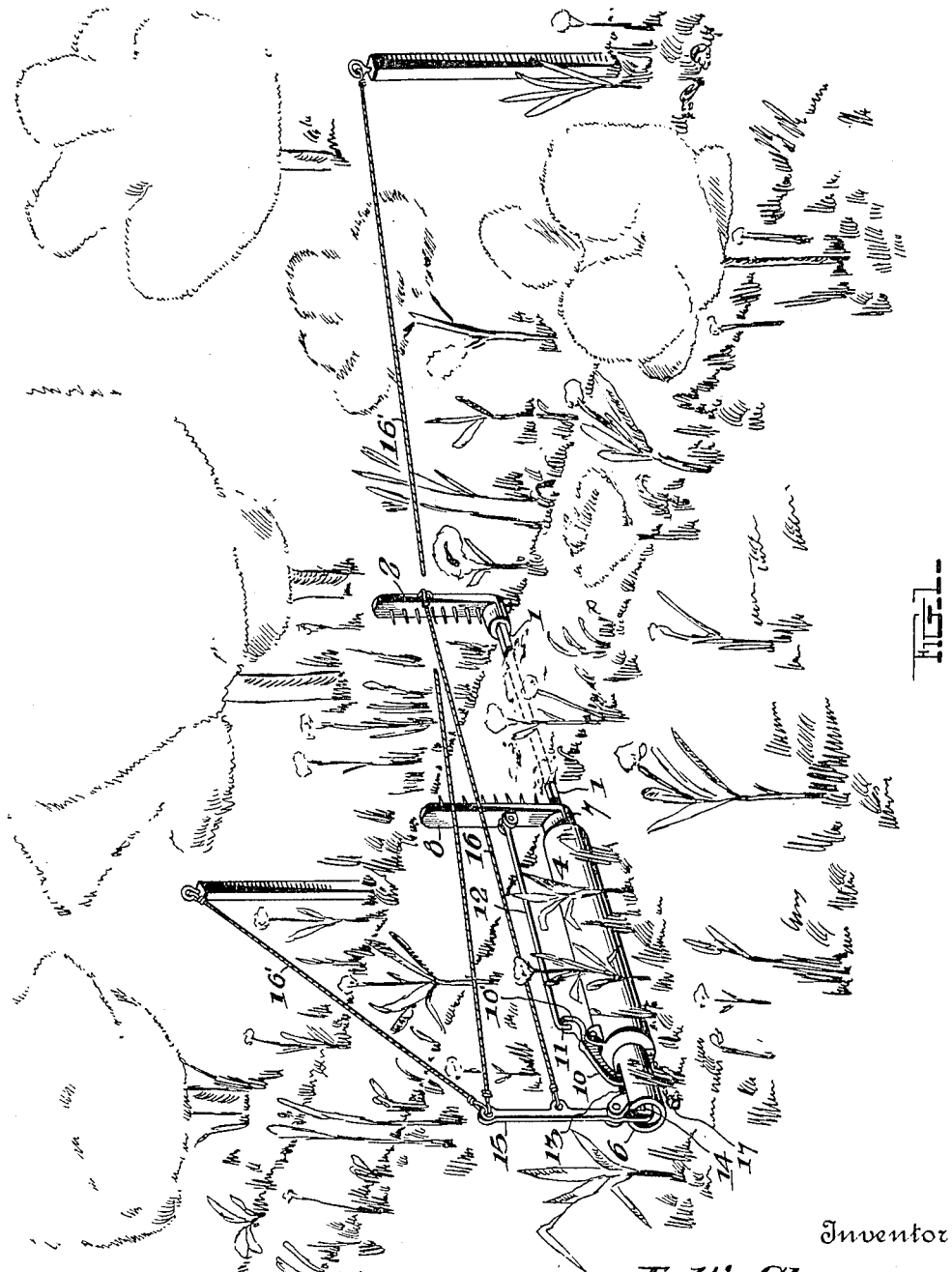

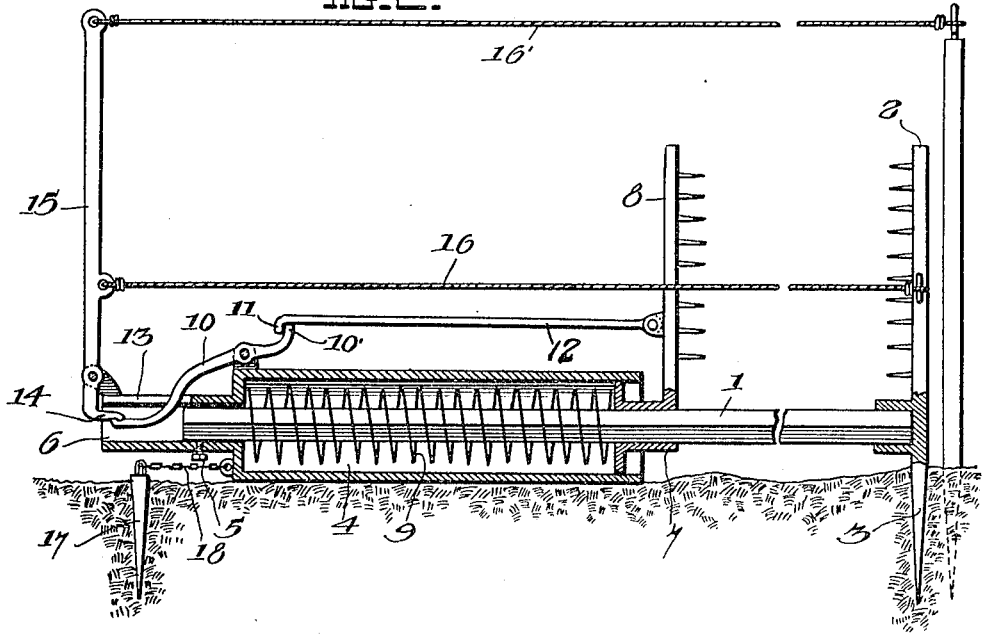
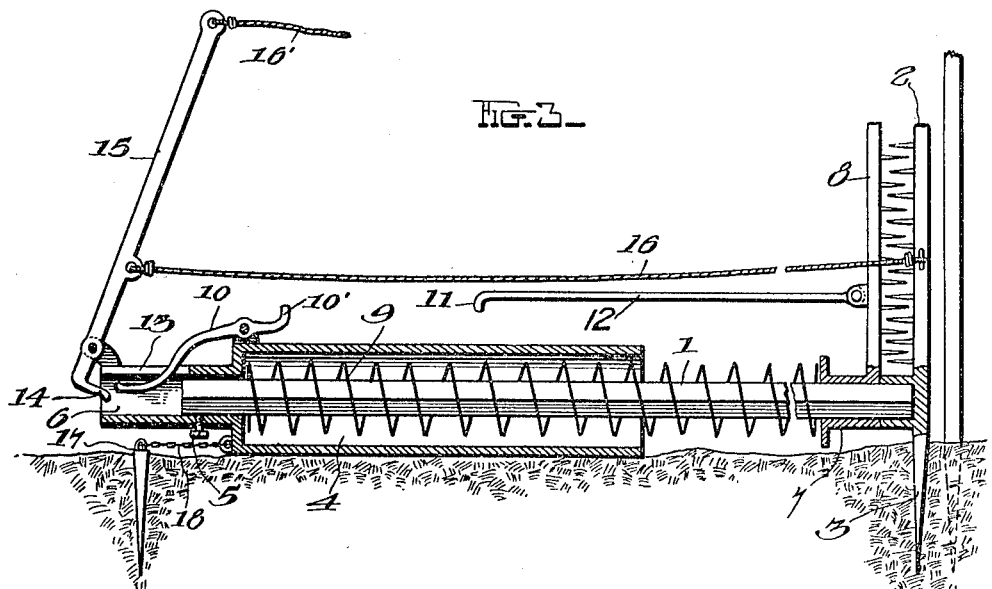

JOHN W. SHARP, OF SWIFTON, ARKANSAS.

ANIMAL-TRAP.

1,207,087.     Specification of Letters Patent.     Patented Dec. 5, 1916.

Application filed September 11, 1916. Serial No. 119,486.

*To all whom it may concern:*

Be it known that I, JOHN W. SHARP, a citizen of the United States, residing at Swifton, in the county of Jackson and State of Arkansas, have invented certain new and useful Improvements in Animal-Traps; and I do declare the following to be a full, clear, and exact description of the invention, such as will enable others skilled in the art to which it appertains to make and use the same.

My invention aims to provide a simple and inexpensive trap to be set across the paths of numerous kinds of fur bearing animals so as to trap any animal passing along such paths.

A further object is to provide auxiliary releases for the trap so as to spring the same prematurely in case a person, horse, cow or the like is passing along the path, thus insuring that they be not injured by the device.

With the foregoing general objects in view, the invention resides in certain novel features of construction and in unique combinations of parts to be hereinafter fully described and claimed, the descriptive matter being supplemented by the accompanying drawings which constitute a part of this application and in which:

Figure 1 is a perspective view of the trap in use; Fig. 2 is a vertical section of the trap in its set position; and, Fig. 3 is a similar view after the trap has been sprung.

Throughout the drawings the numeral 1 designates a horizontal rectangular guide rod having at one of its ends a fixed vertically disposed jaw 2 which will be preferably toothed or pronged as shown, the lower end of said jaw having a stake 3 to be forced into the earth. The other end of the rod 1 projects into a tubular casing 4 and by means of a set screw 5 is secured in one reduced end 6 of said casing.

A slide 7 is mounted on the rod 1 and carries a jaw 8 similar to the jaw 2, a coiled spring 9 being mounted in the casing 4 for projecting the slide 7 to move the jaw 8 toward the jaw 2.

A catch lever 10 is fulcrumed between its ends adjacent the reduced end 6 of the casing 4 and is provided at one end with a nose 10' for engagement with a hook 11 on one end of a link 12, this link being pivoted to the jaw 8. The other end of the lever 10 projects into the reduced end of the casing through a slot 13 and is normally held against upward movement by the laterally directed lower end 14 of a trigger in the form of a lever 15, the upper end of said lever being connected to one end of a trip wire or cord 16 anchored at its other end to the fixed jaw 2.

In use, the trap will be so disposed as to locate its jaws 2 and 8 on opposite sides of the path of the animal which is to be caught and will be held in this position by the stake 3 and an additional stake 17 connected to the casing 4 by means of a chain 18. The jaw 8 is now held in retracted position by passing the hook 11 over the nose 10' and by so positioning the trigger as to dispose its lower end 14 above the lever 10. With the parts in this position, the wire or the like 16 will be stretched across the animal's path and thus when he comes in contact therewith, the trigger 15 will be released so that the spring 9 immediately projects the jaw 8 toward the jaw 2, thus entrapping the animal.

Since it is often necessary to use the traps across paths frequented by stock, such as horses and cows and often traveled by persons, it is highly expedient to provide some means to prevent them from being caught in the device and to this end I provide a pair of auxiliary trip wires 16' which are connected to the trigger 15 and lead obliquely therefrom across the path at a suitable distance from the trap. The wires 16' are spaced an appropriate distance above the earth so as to allow the comparatively small animals to pass thereunder but any object as tall as a person, horse or cow will release the trap prematurely by contact with one or the other of the wires 16'.

From the foregoing taken in connection with the accompanying drawings, it will be obvious that although I have provided a comparatively simple and inexpensive trap, the same will be highly efficient and durable. For these reasons, the construction shown and described constitutes the preferred form of the device. It is to be understood, however, that within the scope of the invention as claimed, numerous changes may be made without sacrificing the principle advantages.

I claim:—

1. A trap comprising a horizontal guide rod having at one end a fixed jaw, a tubular casing in which the other end of said rod is received and secured, means for anchoring said casing on the ground, a slide mounted on said rod and carrying another jaw, a spring surrounding the rod and confined normally in the casing for forcing said slide toward the fixed jaw, means for holding the slide retracted against the tension of the spring, said means including a trigger, and a trip member extending from said trigger to the fixed jaw.

2. A trap comprising a horizontal guide rod having at one end a fixed jaw, a tubular casing in which the other end of said rod is received and secured, a slide mounted on said rod and carrying another jaw, a spring in the casing for forcing said slide toward the fixed jaw, a catch lever fulcrumed on the end of the casing remote from the jaws, said lever having a nose, a link pivotally connected with the second named jaw and having a hook to engage said nose, a trigger fulcrumed to said end of the casing and having a portion to normally hold the catch lever in set position, and a trip member leading from said trigger to the fixed jaw.

In testimony whereof I have hereunto set my hand in the presence of two subscribing witnesses.

JOHN W. X SHARP.
his / mark

Witnesses:
 ROY WRIGHT,
 MAURICE JONES.

Copies of this patent may be obtained for five cents each, by addressing the "Commissioner of Patents, Washington, D. C."